INVENTOR.
KAM LI
BY Morris A. Rabkin
ATTORNEY

June 13, 1961

KAM LI 2,988,731

MEMORY SYSTEM

Filed June 25, 1958

2 Sheets-Sheet 2

INVENTOR.
KAM LI

BY Morris L. Rabkin
ATTORNEY

1

2,988,731
MEMORY SYSTEM
Kam Li, Gloucester, N.J., assignor to Radio Corporation of America, a corporation of Delaware
Filed June 25, 1958, Ser. No. 744,483
10 Claims. (Cl. 340—174)

This invention relates to memory systems, and particularly to memory systems for storing a signal level.

Most prior art systems use a linear capacitor to store a signal level. The charge of the capacitor corresponds to the signal level. Such storage systems are used, for example, in servomechanism systems, in information handling systems, in communication systems, and the like. One disadvantage of the prior storage systems is that the capacitor charge varies with time due to the finite leakage resistance of the capacitor. Certain of the prior systems, such as a Miller integrator, use additional circuits and components to compensate for the leakage of the capacitor.

It is an object of the present invention to provide an improved storage system for storing a signal level.

Another object of the invention is to provide an improved storage system wherein a signal level may be stored unaltered for an indefinitely long time.

Still another object of the present invention is to provide an improved storage system capable of storing, for an indefinitely long time, voltage signals of momentary duration.

According to the present invention, a storage system includes a magnetic memory device capable of being set to a desired one of a plurality of flux levels. The set flux level corresponds to the level of the input signal. An oscillatory circuit controlled by the memory device continuously applies an output signal to a converter circuit. The converter circuit changes the oscillatory output signal to an output level which is compared with the level of the input signal. When the compared signals are unequal, a feedback signal is generated. The feedback signal changes the flux level of the memory device in the proper direction to make the output signal level equal to the input signal level. The input signal may then be removed, and thereafter the output level of the converter circuit corresponds to the input signal level.

Figure 1:
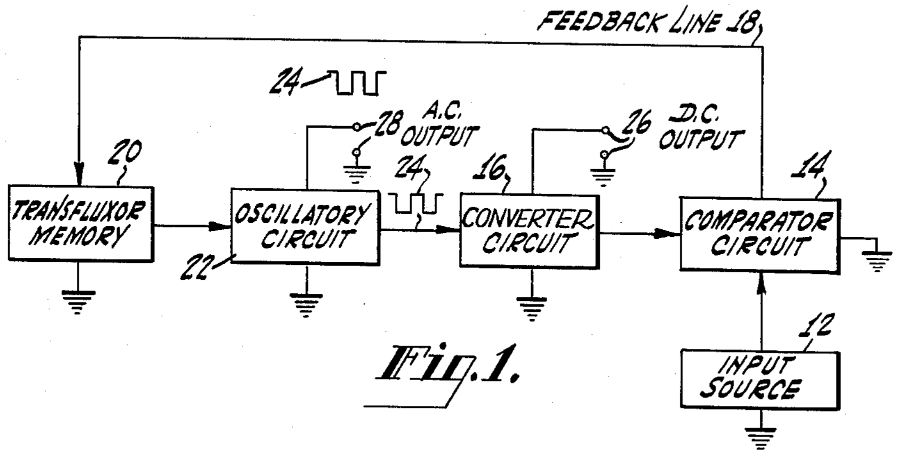
FIG. 1 is a schematic diagram in block form of a memory system according to the invention.

Input signals to be stored by the memory system of FIG. 1 are applied from an input source 12 to one input of a comparator circuit 14. The signals from the input source 12 may assume different voltage levels. The input voltage from the input source 12 as a reference is compared with the output voltage of a converter circuit 16 in the comparator 14. When the compared levels are unequal, a feedback signal is applied by the feedback line 18 coupled to a memory device, in this instance a transfluxor memory 20. The level of flux in the memory device 20 is altered by the feedback signal in a direction to make the output signal of the converter 16 equal to the input signal from the input source 12. The stored flux in the memory device 20 is continuously interrogated by an oscillatory circuit 22. The frequency of the oscillatory circuit changes in accordance with the level of the stored flux in the memory 20. A higher level of stored flux causes the oscillatory circuit frequency 22 to decrease, a smaller level of stored flux causes the oscillatory circuit 22 frequency to increase. The oscillatory circuit 22 output signals, for example, may be square-wave output signals as shown by the waveform 24. The output signals of the oscillatory circuit 22 are applied to the converter circuit 16 which provides a voltage level proportional to the period of the oscillatory circuit 24. The operation continues until the output voltage of the converter circuit 16 is equal to the input source 12 voltage. In practice, a millisecond is sufficient time for the circuit to settle to a steady condition. Faster settling times can be obtained by varying the circuit parameters. After the circuit settles, no further feedback signals are applied to the memory device 12. The output voltage of the converter circuit 16 remains at the set voltage level for an indefinitely long time even after the input reference signal is removed.

2

The memory system can provide a D.C. output or an A.C. (alternating current) output signal. The D.C. output signal of the memory system conveniently may be taken across another pair of output terminals 26 of the rectifier circuit 16. The A.C. output signal frequency corresponds to the reference input voltage. Conveniently, the A.C. output may be taken across a pair of A.C. output terminals 28 of the oscillatory circuit 22. Also, if desired, an intermittent D.C. output may be obtained across the output terminals 26 by connecting a sampling switch (not shown) between the converter circuit 16 and the D.C. output terminals 26.

Application of a new input voltage having a different reference level to the comparator circuit 14 causes the memory system to change in the manner described until no further feedback signals appear on the feedback line 18. The new D.C. output at the D.C. output terminals 26 then corresponds to the new input reference voltage. The new input voltage may then be disconnected from the comparator circuit 14.

Figure 2:
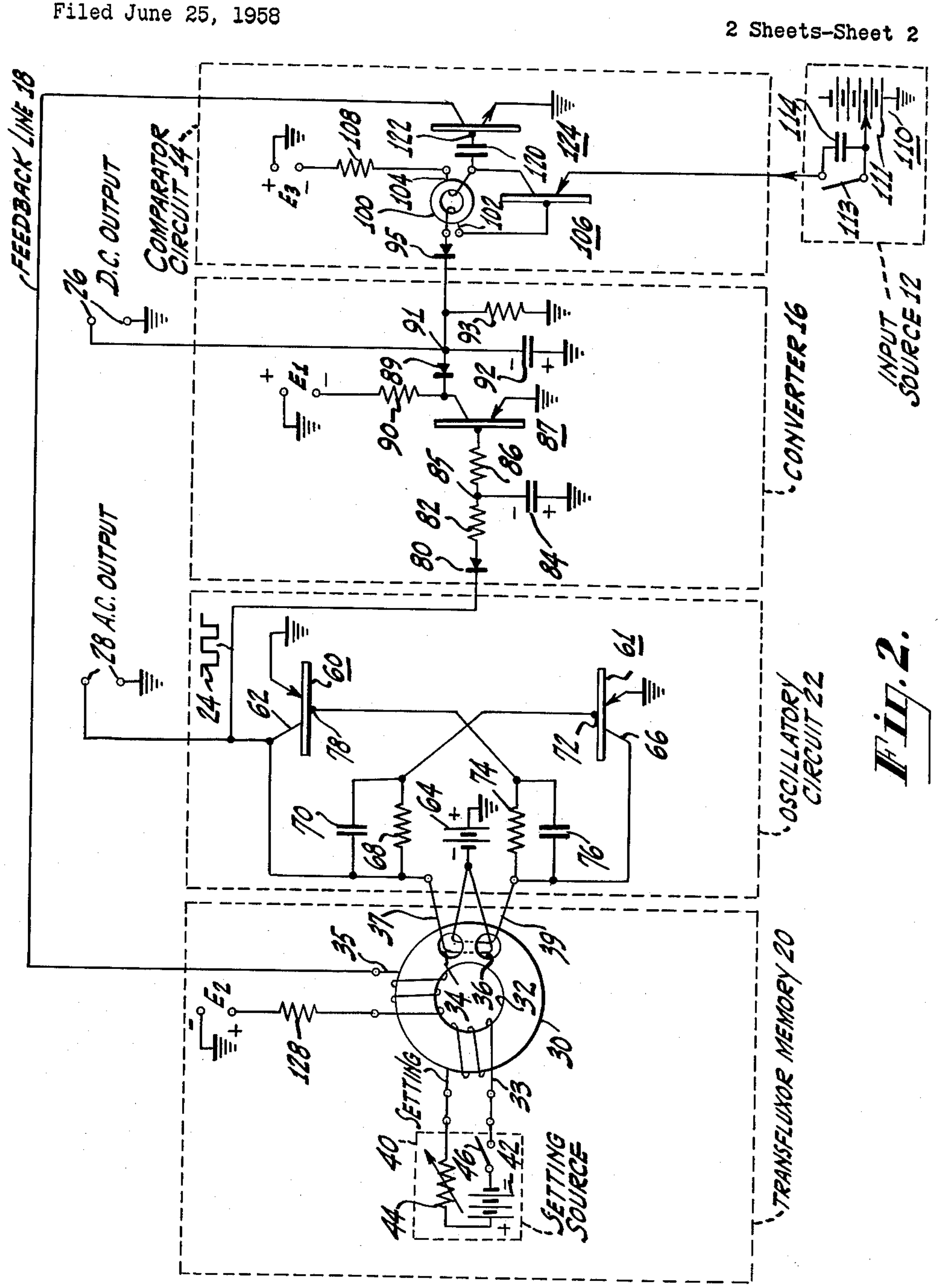
FIG. 2 is a schematic diagram of one embodiment of a memory system of FIG. 1.

As shown in the embodiment of FIG. 2, the transfluxor memory device 20 includes a three-aperture transfluxor core 30 having a relatively large setting aperture 32 and a pair of output apertures 34, 36. Other forms of transfluxor cores may be used, if desired. Details of the construction and operation of a "transfluxor" are given in an article by J. A. Rajchman and A. W. Lo published in the March 1956, Proceedings of the IRE entitled "The Transfluxor." A setting winding 33 and the feedback winding 35 are each linked to the transfluxor 30 through the setting aperture 32. A pair of output windings 37, 39 are each linked to the transfluxor 30 through the output apertures 34, 36. Connected to the setting winding 33, is a source 40 of setting signals. A constant voltage source such as a battery 42, and a variable resistor 44 may be used for the setting source 40. A normally open, single-pole, single-throw switch 46 is connected in series between the battery 42 and the setting winding 33. Any other suitable source such as a constant current or a "flux" source may be used for setting the transfluxor 30. As described in the above-mentioned article, when the transfluxor 30 is in its set condition, an appreciable flux change is produced in the narrow legs adjacent the output apertures 34, 36 by signals applied to the windings 37, 39.

The oscillatory circuit 22 may be, for example, a free-running, square-wave multivibrator. For example, the oscillatory circuit 22 may use a pair of PNP type transistors 60, 61 cross-coupled to each other in regenerative fashion. Such a multivibrator circuit is described in an article by A. J. Meyerhoff and R. M. Tillman entitled "A High-Speed Two-Winding Transistor-Core Oscillator," published in Paper 4–6 of the February 15, 1957, Transistor and Solid State Circuits Conference, Philadelphia, Pennsylvania.

The first output winding 37 of the transfluxor 30 is connected to the collector electrode 62 of the upper transistor 60 and to the negative terminal of a supply source such as a battery 64. The other output winding 39 of the transfluxor 30 is connected to the collector electrode 66 of the lower transistor 61 and to the supply source 64. The emitter electrodes of the transistors 60 and 61, and the positive terminal of the supply source 64 are connected to ground. A resistor 68 and a speed-up capacitor 70 are connected in parallel with each other between the collector electrode 62 of the upper transistor 60 and the base electrode 72 of the lower transistor 61. A similar network of a resistor 74 and a speed-up capacitor 76 connect the collector electrode 66 of the lower transistor 61 and the base electrode 78 of the upper transistor 60.

In operation, the frequency of the multivibrator circuit is controlled by the voltages induced in the transfluxor output windings 37 and 39. The two transistors 60 and 61 alternately operate between their fully cut-off and fully saturated conditions. The time interval that the transistor 61 is cut-off depends upon the voltage induced in the output winding 37 connected to the collector electrode 62 of the then conducting transistor 60. Similarly, the cut-off time of the transistor 60 depends upon the voltage induced in the output winding 39 connected to the collector electrode 66 of the then conducting transistor 61. The induced voltage must be equal to or greater than a critical amplitude required to maintain the base current flow of the conducting transistor. When the induced voltage drops below this critical value, the then conducting transistor rapidly changes to its cut-off condition and the other transistor changes to its saturated condition. The square wave output of the multivibrator is indicated by the waveform 24.

The amount of voltage induced in the output windings 37 and 39 depends upon the set flux available for change about the output apertures 34 and 36. In the blocked condition of the transfluxor 30, relatively little or no flux is available for change, because the two portions of material on either side of the output apertures 34 and 36 are saturated with flux in mutually opposite senses, with respect to the output apertures 34, 36. Accordingly, the frequency of the multivibrator circuit is relatively high since relatively little voltage is induced in the output windings 37 and 39. Any suitable means, not shown, may be used for setting the transfluxor 30 to its blocked condition.

The transfluxor 30 is changed to its fully set condition by closing the switch 46 of the setting source 40. The resulting setting current flow in the setting winding 33 magnetizes the transfluxor 30 to its fully set condition. In the fully set condition, substantially all the flux in the portions of material on either side of the output apertures 34 and 36 is available for change and, accordingly, the frequency of the multivibrator is relatively low. The amount of flux available for change in the transfluxor 30 during operation of the system is controlled by magnetizing current applied to the feedback winding 35 in a manner to be described more fully hereinafter.

The square-wave output of the multivibrator varies between a zero reference level and a negative potential. Waveform 24 is passed by a first diode 80 of the converter circuit 16 and a resistor 82 to a storage capacitor 84 connected between the resistor 82 and the common ground at a junction 85. Another resistor 86 connects the junction 85 to the base electrode of a PNP current amplifying transistor 87. The value of the first resistor 82 is smaller, say 5 times smaller, than the value of the resistor 86. Therefore, the capacitor 84 has a relatively short RC time constant for charging and a relatively long time constant for discharging. The capacitor 84 is charged by the multivibrator output in a direction to apply negative potential to the base electrode of the amplifying transistor 87. The amount of charge stored in the capacitor 84 corresponds to the operating frequency of the oscillatory circuit 22. Thus, the network of the capacitor 84 and the resistors 82 and 86 functions to convert the period of the oscillatory circuit to a D.C. voltage level. The longer the period, the longer the discharge time and the higher the D.C. output level. The negative potential applied to the base electrode of the amplifying transistor 87 causes a current flow through its emitter-collector path and a resistor 90 connected to the negative terminal of a supply source E1. The source E1 has its positive terminal connected to ground. The time at which the transistor 87 cuts off is a function of the discharge time of the capacitor 84 which is controlled by the period of the oscillatory circuit 22. The collector negative output voltage when the transistor amplifier 87 is cut-off is coupled to an output junction 91 by means of a diode 89. The diode 89 is poled to pass a negative going signal to the common junction 91. This negative signal causes a second storage capacitor 92 to charge in a direction to make its upper plate negative with respect to its lower plate. The second storage capacitor 92 charges to a peak negative voltage proportional to the period of the oscillatory circuit. The longer the period, the higher the charge on the capacitor 92. The upper plate of the second storage capacitor 92 is connected to the junction 91 and the lower plate of the capacitor 92 is connected to ground. A discharge resistor 93 is connected to ground across the capacitor 92. The stored charge on the second capacitor 92 also corresponds to the D.C. output signal of the memory system. One of the memory system D.C. output terminals 26 is connected to the output junction 91 of the converter 16.

The output junction 91 is also connected to the comparator circuit 14 by means of a coupling diode 95. The comparator circuit 14 includes, for example, a current source arranged to apply a feedback pulse to the feedback line 18. The current source of the comparator 14 is provided by a core 100 and a transistor 106 arranged as a blocking oscillator. A pair of drive windings 102 and 104 are linked to the core 100. The drive winding 102 connects the anode of the coupling diode 95 to the base electrode of a switch transistor 106. The collector electrode of the switch transistor 106 is connected in series with the other drive winding 104 of the core 100, and a current limiting resistor 108 to the negative terminal of a supply source E3. The positive terminal of the source E3 is connected to ground. The emitter-electrode of the switch transistor 106 is connected to the output of the input source 12.

The input source 12 includes a reference source 110 of variable potential. By way of example, the reference source 110 may be a variable voltage source such as a multi-tapped battery 111. The movable arm of the battery 111 is connected in series with a single-pole, single-throw switch 113 to the emitter-electrode of the switch transistor 106 of the comparator circuit 14. The positive terminal of the battery 111 is connected to ground. A capacitor 114 is connected across the terminals of the switch 113 to prevent transient signals from being generated by the switch 113.

The switch transistor 106 of the comparator 14 conducts only when its emitter-base diode is biased in the forward direction. Thus, when the potential at the output junction 91 of the converter circuit 16 is less negative than the negative reference potential of the battery 111, the emitter-base diode of the switch transistor 106 is reversed biased. When the potential of the output junction 91 of the converter circuit 16 is equal to or more negative than the potential of the reference source 110, the emitter-base diode of the switch transistor 106 is forward biased and the switch transistor 106 conducts. The current flow in the emitter-collector path of the switch transistor 106 increases in regenerative fashion producing a relatively large flux change in the core 100. The flux change in the core 100 produces an output signal across the drive winding 104. The core 100 returns to its initial condition subsequent to each output signal in the manner of a conventional blocking oscillator.

The output signal of the switch transistor 106 is A.C. coupled by a capacitor 120 to the base electrode 122 of a feedback transistor 124. The collector electrode of the feedback transistor 124 is connected to the feedback line 18 and the emitter electrode is connected to ground. The feedback transistor 124, for example, may be of the NPN type. When the feedback transistor 124 conducts, the resulting current flow is from the positive terminal of a supply source E2, through a current limiting resistor 128, through the feedback winding 35 of the transfluxor core 30, and then through the collector-to-emitter path of the feedback transistor 124 to ground. In certain instances, the feedback transistor 124 can be eliminated, by connecting the feedback winding 35 of the transfluxor 30 in the collector-emitter path of the switch transistor 106. In the latter case, the source E3 and the resistor 108 are arranged to limit the current flow to prevent overcorrecting the setting of the transfluxor 30.

The feedback current applies a setting signal to the transfluxor 30 in a direction to change it from its fully set condition towards its blocked condition. Therefore, an increment of flux change is applied to the transfluxor 30 in a direction to increase the frequency of the oscillatory circuit 22. This increased frequency operates to reduce the charge of the storage capacitor 92 of the converter circuit 16, thereby reducing the potential at the output junction 91. The operation continues in stepwise fashion until the potential of the output junction 91 and the potential of the reference source 110 are substantially equal. By substantially equal is meant that the output junction 91 is slightly positive relative to the reference signal so that the switch transistor 106 is cut-off. At this time, the reference signal from the input source 12 may be disconnected from the memory system, as by opening switch 113. The oscillatory circuit 22 continues to operate at the thus set frequency until a new reference signal of different potential is applied.

Figure 3:
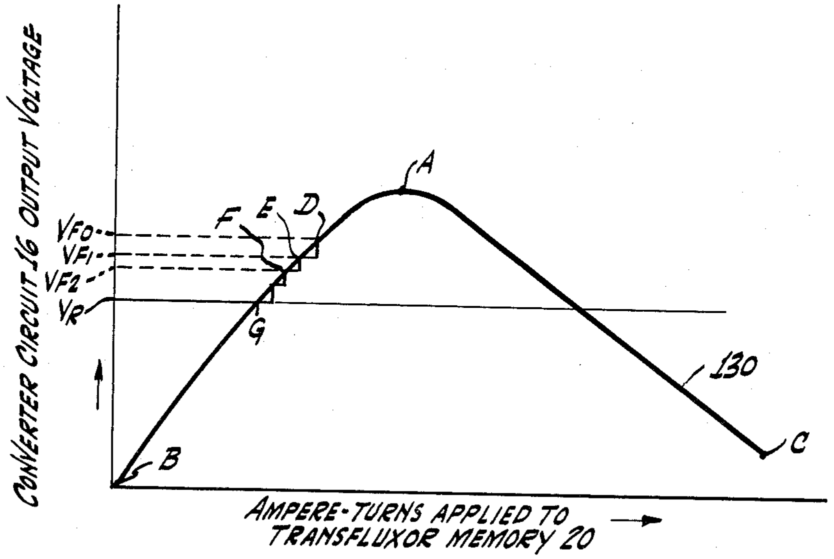
FIG. 3 is a graph of output voltage vs. setting ampere-turns and useful in explaining the operation of the memory system of FIG. 1.

The graph 130 of FIG. 3 represents the variation of output voltage of the converter circuit 16 in response to the setting ampere-turns applied to the transfluxor 30. The maximum voltage of the curve 130 at the point A corresponds to the fully set condition of the transfluxor 30 when a relatively large flux change is produced due to current flow in the output windings 37 and 39. The number of turns in the output windings 37, 39 and the transistors 60 and 61 are chosen so that the magnetizing force applied to the transfluxor 30 due to the operation of the oscillatory circuit 22 does not produce any flux change in the wide leg of the transfluxor 30. The minimum point B at the left end of the curve 130 corresponds to the blocked condition of the transfluxor 130 in one direction. The minimum point C at the right end of the curve 130 corresponds to the blocked condition of the transfluxor 30 in the other direction. Any one point between the minimum and maximum points B and A of the curve 130 corresponds to a different set condition of the transfluxor 30.

Assume for the moment that the setting of the transfluxor 30 corresponds to a point D of the curve 130. The setting may be made either by the initial setting source 40 or by a previous reference input signal from the input source 12. The converter circuit 16 output level then corresponds to a voltage VF0. Assume also that a new reference input signal of voltage VR is applied by the input source 12 to the comparator circuit 14. This new reference potential VR causes the switch transistor 106 to operate in the manner described to apply an increment of flux change to decrease the setting level of the transfluxor 30. The decreased setting of the transfluxor 30 causes the oscillatory circuit 22 to operate at a higher frequency. Therefore, the converter circuit 16 output potential then changes to a point E of lower potential VF1.

Another increment of flux is applied to the transfluxor 30 by a feedback winding to again reduce the setting level of the transfluxor 30. The operating frequency of the oscillatory circuit 22 again increases. The converter circuit 16 output again changes to a still lower value VF2 corresponding to the point F of the curve 130. Successive changes are made in the setting level of the transfluxor 30 until the desired operating point G is reached. The converter circuit output voltage successively changes until the desired voltage VR corresponding to the point G of the curve 130 is reached. At this time, the output junction 91 potential and the reference potential are equal and no further changes are made in the setting level of the transfluxor 30. Thereafter, the memory system remains at the set level.

Preferably, the transfluxor 30 is returned to its fully set condition before each application of a new input reference level. In such case, the memory system operation is carried out in one direction from a higher voltage level towards the desired reference voltage level.

There have been described herein improved memory systems for storing a signal level. Once the memory system settles to the desired level, the input signal can be removed and the system will remain at the desired set level until a new input signal of different level is received.

What is claimed is:

1. A memory system comprising a transfluxor having a central and first and second other apertures, a first winding linked through said central aperture for orienting the flux in the portions on either side of said other apertures in one sense, a second winding linked through said central aperture for reversing at least some of the flux in the transfluxor portion between said central and said other apertures to the opposite sense, an oscillatory circuit having windings linked through said other apertures, the operating frequency of said oscillatory circuit being controlled by the flux in the said portions on either side of said other apertures, a converting circuit for changing said oscillatory circuit frequency to a voltage level, a comparing circuit having one input for receiving said voltage level, another input for receiving a reference voltage level, and an output connected to said second winding, said comparing circuit being operative to apply signals to said second winding whenever said reference voltage level is less than said converting circuit voltage level.

2. A memory system as claimed in claim 1, said memory system having an output connected to said oscillatory circuit.

3. A memory system as claimed in claim 1, said memory system having an output connected to said converting circuit.

4. A memory system comprising a three-apertured transfluxor having first and second windings linked through one of said apertures and a pair of windings linked through the other two of said apertures, a free-running oscillatory circuit including said pair of windings, means for applying a setting signal to said first winding to cause said oscillatory circuit to assume a relatively low operating frequency, a feedback loop including said second winding for continuously applying feedback signals to said second winding to cause said oscillatory circuit to assume relatively higher operating frequencies, said feedback loop further including means for converting said oscillatory circuit operating frequency to a signal level, and means for comparing said signal level with a reference level, said feedback signals being stopped when said signal level equals said reference level.

5. A memory system for storing a reference level comprising a multi-apertured core of rectangular hysteresis loop material, said core having a plurality of separate response conditions between a fully set condition and a blocked condition, an oscillatory circuit having windings linked through a pair of output apertures of said core, said oscillatory circuit being capable of operating at different frequencies respectively corresponding to said response conditions of said core, a converter circuit connected to said oscillatory circuit for providing an output level corresponding to the operating frequency of said oscillatory circuit, a comparator circuit for comparing said reference level and said output level and providing an output signal in response to the comparison of said levels, and a feedback winding linked through a setting aperture of said core and connected to respond to said comparator output signal.

6. A memory system for storing a desired signal level comprising a multi-apertured core of substantially rectangular hysteresis loop material, an oscillatory circuit having windings linked to said core, said core having a plurality of response conditions with respect to current flow in said oscillatory circuit windings, means for setting said core to a desired one of said response conditions, said oscillatory circuit having a plurality of operating frequencies each corresponding to a different one of said response conditions, converting means connected to said oscillatory circuit for converting the frequency of said oscillatory circuit to a corresponding output signal level, and comparing means having inputs for receiving said desired and said output signal levels for comparison and having an output for controlling said setting means.

7. A control circuit comprising a multi-apertured core of substantially rectangular hysteresis loop material, said core having a blocked condition and a plurality of set conditions, an oscillatory circuit having windings linked to said core through a pair of said apertures, said oscillatory circuit having a plurality of operating frequencies each related to a different one of the said core conditions, a converting circuit coupled to said oscillatory circuit for converting said operating frequencies to voltage levels each related to a different one of said operating frequencies, a comparing circuit having an output and first and second inputs, said first input being coupled to said converting circuit for comparing said converting circuit voltage level with an input voltage level received at said second input, and setting means coupled to said core for controlling the said set conditions of said core, said setting means being connected to said comparing circuit output.

8. A control circuit comprising a multi-apertured core of substantially rectangular hysteresis loop material, said core having a plurality of set conditions, an oscillatory circuit having windings linked through a pair of said core apertures, said oscillatory circuit having a plurality of operating frequencies each related to a different one of said set conditions, means for converting the operating frequency of said oscillatory circuit to a signal level, a comparing circuit having one input for receiving an input signal level and another input for receiving said converting means signal level, said comparing circuit providing an output signal upon inequality between said received signal levels, and setting means coupled to said core for establishing said core in a desired one of said set conditions, said setting means being controlled by said comparing means output signal.

9. A control system comprising a transfluxor memory device having a central and two other apertures, first and second windings linked through said central aperture, an oscillatory circuit including a pair of windings linked to said transfluxor through said two other apertures, a converting circuit connected to said oscillatory circuit for producing an output level, said output level changing inversely with the operating frequency of said oscillatory circuit, an output connected to said converting circuit, means for applying a setting signal to said first winding to cause said oscillatory circuit to operate at a relatively low frequency, and means for applying successive signals to said second winding to cause said oscillatory circuit to operate at successively higher frequencies.

10. A control system comprising a transfluxor memory device having a central and two other apertures, first and second windings linked through said central aperture, an oscillatory circuit including a pair of windings linked to said transfluxor through said two other apertures, means for applying a setting signal to said first winding to cause said oscillatory circuit to operate at a relatively low frequency, means for applying successive signals to said second winding to cause said oscillatory circuit to operate at successively higher frequencies, a converting circuit connected to said oscillatory circuit for producing an output level varying inversely with said oscillatory circuit operating frequency, a comparing circuit connected to said converting circuit for comparing said output level with a reference level, and said second winding signal applying means being controlled by said comparing circuit.

References Cited in the file of this patent

UNITED STATES PATENTS

| | | |
|---|---|---|
| 2,708,219 | Carver | May 10, 1955 |
| 2,806,988 | Gulpizio | Sept. 17, 1957 |
| 2,855,586 | Brown | Oct. 7, 1958 |
| 2,934,350 | Schaefer | Apr. 26, 1960 |